(12) United States Patent
Bastide et al.

(10) Patent No.: US 10,924,586 B2
(45) Date of Patent: Feb. 16, 2021

(54) AGGREGATING VIRTUAL REALITY (VR) SESSIONS

(71) Applicant: International Business Machines Corporation, Armonk, NY (US)

(72) Inventors: Paul R. Bastide, Boxford, MA (US); Lin Sun, Cary, NC (US); Liam S. Harpur, Dublin (IE); Matthew E. Broomhall, Goffstown, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 15/993,398

(22) Filed: May 30, 2018

(65) Prior Publication Data
US 2019/0373080 A1 Dec. 5, 2019

(51) Int. Cl.
*H04L 29/08* (2006.01)
*G06T 11/00* (2006.01)
(Continued)

(52) U.S. Cl.
CPC .......... *H04L 67/327* (2013.01); *G06K 9/6215* (2013.01); *G06T 11/00* (2013.01);
(Continued)

(58) Field of Classification Search
CPC .. A63F 13/12; A63F 2300/8082; A63F 13/10; A63F 13/352; A63F 13/48; A63F 13/60; A63F 13/795; A63F 2300/105; A63F 2300/5533; A63F 13/21; A63F 13/213; A63F 13/216; A63F 13/25; A63F 13/26; A63F 13/31; A63F 13/33; A63F 13/5255; A63F 13/56; A63F 13/61; A63F 13/63; A63F 13/65; A63F 13/70; A63F 13/71; A63F 13/847; A63F 13/85; A63F 13/86; A63F 2300/205; A63F 2300/209; A63F 2300/401; A63F 2300/406;
(Continued)

(56) References Cited

U.S. PATENT DOCUMENTS

| 6,020,885 | A | 2/2000 | Honda |
| 6,354,946 | B1 * | 3/2002 | Finn ........................ A63F 13/12 463/40 |

(Continued)

OTHER PUBLICATIONS

Ying et. al., "Walkthrough in Large Environments Using Concatenated Panoramas", Dec. 19-23, 2009, Proceedings of the 2009 IEEE International Conference on Robotics and Biomimetics, p. 286-291; Downloaded on Sep. 15, 2020 IEEE Xplore. (Year: 2009).*

(Continued)

*Primary Examiner* — Kamal B Divecha
*Assistant Examiner* — Sandarva Khanal
(74) *Attorney, Agent, or Firm* — Fabian VanCott; Steven L. Nichols

(57) ABSTRACT

Aggregating virtual reality (VR) sessions includes supporting a plurality of requests for a VR session. Further, aggregating VR sessions includes determining a similarity between a first VR request and a second VR request. Still further, aggregating VR sessions includes merging a first VR environment supporting the first VR request and a second VR environment supporting the second VR request.

13 Claims, 8 Drawing Sheets

(51) Int. Cl.
*H04L 29/06* (2006.01)
*G06K 9/62* (2006.01)

(52) U.S. Cl.
CPC ...... *H04L 67/1014* (2013.01); *H04L 67/2823* (2013.01); *H04L 67/38* (2013.01)

(58) Field of Classification Search
CPC ............ A63F 2300/407; A63F 2300/50; A63F 2300/513; A63F 2300/532; A63F 2300/534; A63F 2300/5573; A63F 2300/535; A63F 2300/5506; A63F 2300/556; A63F 2300/5593; A63F 2300/6009; G06F 3/04815; G06F 16/285; G06F 1/163; G06F 2009/4557; G06F 30/20; G06F 3/011; G06F 3/012; G06F 3/013; G06F 3/0304; G06F 3/048; G06F 3/04842; G06Q 10/10; G06Q 20/14; G06Q 30/02; G06Q 40/12; G06T 19/006; G06T 11/00; G06T 13/40; G06T 15/20; G06T 19/00; G06T 19/20; G06T 2200/04; G06T 2210/36; G06T 2215/16; G06T 2219/024; G06T 3/0031; G06T 7/70; H04L 67/38; H04L 2463/102; H04L 29/06; H04L 63/0428; H04L 63/08; H04L 67/1014; H04L 67/18; H04L 67/2823; H04L 67/303; H04L 67/306; H04L 67/327; H04L 69/329; H04L 29/06034; G02B 2027/0138; G02B 2027/014; G02B 27/0093; G02B 27/017; G02B 27/0172; G06K 9/00671; G06K 9/6215; G06N 3/006; H04N 19/27; H04N 21/2405; Y10S 707/99948; Y10S 707/99952

See application file for complete search history.

(56) References Cited

U.S. PATENT DOCUMENTS

| | | | | |
|---|---|---|---|---|
| 6,421,047 | B1* | 7/2002 | de Groot | A63F 13/12 345/419 |
| 7,693,702 | B1* | 4/2010 | Kerner | G06F 3/011 703/22 |
| 8,893,000 | B2 | 11/2014 | Hamilton | |
| 9,830,679 | B2 | 11/2017 | Monk | |
| 10,403,050 | B1* | 9/2019 | Beall | G02B 27/017 |
| 2003/0177187 | A1 | 9/2003 | Levine | |
| 2003/0195735 | A1 | 10/2003 | Rosedale | |
| 2007/0024644 | A1* | 2/2007 | Bailey | G06F 3/011 345/633 |
| 2009/0113421 | A1* | 4/2009 | Hamilton, II | G06Q 10/10 718/1 |
| 2009/0235183 | A1 | 9/2009 | Hamilton | |
| 2009/0262107 | A1 | 10/2009 | Castelli | |
| 2010/0161456 | A1 | 6/2010 | Boss | |
| 2010/0210364 | A1* | 8/2010 | York | A63F 13/12 463/43 |
| 2011/0078052 | A1* | 3/2011 | Ciptawilangga | G06Q 30/06 705/27.1 |
| 2012/0142415 | A1* | 6/2012 | Lindsay | H04N 5/2224 463/33 |
| 2013/0090170 | A1* | 4/2013 | Reed | A63F 13/35 463/42 |
| 2014/0323226 | A1* | 10/2014 | Agrawal | A63F 13/332 463/42 |
| 2015/0205367 | A1* | 7/2015 | Bandt-Horn | G06F 3/0202 345/156 |
| 2015/0279106 | A1* | 10/2015 | Blanchflower | G06F 3/1462 345/2.2 |
| 2016/0267721 | A1 | 9/2016 | Hamilton | |
| 2018/0005429 | A1 | 1/2018 | Osman | |
| 2018/0178123 | A1* | 6/2018 | Goetgeluk | A63F 13/65 |

OTHER PUBLICATIONS

Nick Statt; "Facebook's bold and bizarre VR hangout app is now available for the Oculus Rift"; Apr. 18, 2017; 4 pages; https://www.theverge.com/2017/4/18/15332658/facebook-spaces-virtual-reality-oculus-rift-f8-conference-2017.

Matt Brown; "Exploring multiplayer shooters and the limitations of VR"; Aug. 22, 2016; 4 pages; https://www.vrheads.com/limitations-virtual-reality-and-multiplayer-shooters.

Dean Takahashi; "The DeanBeat: High Fidelity takes us dancing in a virtual reality club"; Feb. 16, 2018; 6 pages; https://venturebeat.com/2018/02/16/the-deanbeat-high-fidelity-takes-us-dancing-in-a-virtual-reality-club/.

Joaquin Ketter, et al.; "Toward a peer-to-peer shared virtual reality"; IEEE Computer Society; Proceedings of the 22nd International Conference on Distributed Computing Systems Workshops; 2002; 6 pages.

Rachel Metz; "Second Life Is Back for a Third Life, This Time in Virtual Reality"; Jan. 27, 2017; 3 pages; https://www.technologyreview.com/s/603422/second-life-is-back-for-a-third-life-this-time-in-virtual-reality.

Thammathip Piumsomboon, et al.; "[Poster] CoVAR: Mixed-Platform Remote Collaborative Augmented and Virtual Realities System with Shared Collaboration Cues"; IEEE Computer Society; 2017; 2017 IEEE International Symposium on Mixed and Augmented Reality Adjunct Proceedings; 2 pages.

Yu Zhu, et al.; "SAVE: shared augmented virtual environment for real-time mixed reality applications"; ACM; 2016; VRCAI '16; China; 9 pages.

* cited by examiner

AGGREGATING VIRTUAL REALITY (VR) SESSIONS

BACKGROUND

The present invention relates to virtual reality (VR) environments, and more specifically, to aggregation of VR environments for a plurality of requests for a VR session.

SUMMARY

According to an embodiment of the present invention, a method for aggregating virtual reality (VR) sessions may include supporting a plurality of requests for a VR session, determining a similarity between a first VR request and a second VR request, and merging a first VR environment supporting the first VR request and a second VR environment supporting the second VR request.

According to another embodiment of the present invention, a system may include a server computing device to support a plurality of virtual reality (VR) requests, and a network connection for the server computing device to couple to a plurality of VR systems to form a plurality of VR environments. The server system may include a similarity engine to determine a similarity between a first VR request and a second VR request, and a merge engine to merge a first VR environment supporting the first VR request and a second VR environment supporting the second VR request.

According to another embodiment of the present invention, a computer program product for aggregating virtual reality (VR) sessions may include a computer readable storage medium including computer usable program code embodied therewith. The computer usable program code, when executed by a processor, may determine a similarity between a first VR request and a second VR request, and merge a first VR environment supporting the first VR request and a second VR environment supporting the second VR request.

BRIEF DESCRIPTION OF THE DRAWINGS

The accompanying drawings illustrate various examples of the principles described herein and are part of the specification. The examples do not limit the scope of the claims.

Figure 1:
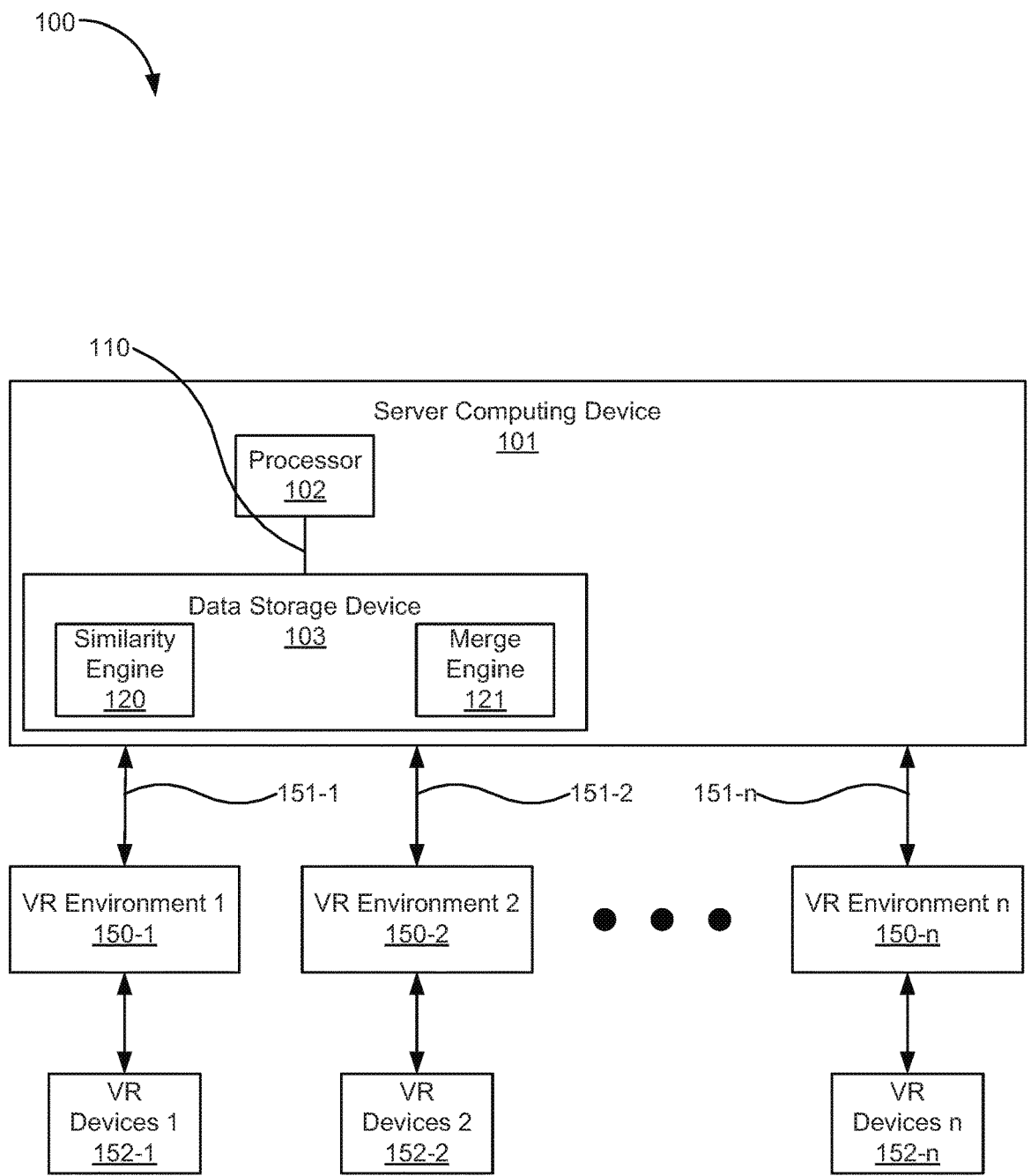
FIG. 1 is a block diagram of a system for aggregating virtual reality (VR) sessions, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description, however, the description is not limited to the examples and/or implementations provided in the drawings.

DETAILED DESCRIPTION

The present specification describes methods, systems, and computer program products for aggregating virtual reality (VR) sessions. In some examples, computing resources that support a VR environment may be limited. VR systems may provide users with life-like quality realities that utilize large computing resources such as processing and memory resources. In some examples, these computing resources may be provided over a network by a server computing device due to the computing resource intensive nature of providing VR environments to users. Aggregation of the VR sessions and their respective environments would reduce the utilization of computing resources within the VR system.

Further, in some examples, the VR system may provide a large number of individuals with access to and utilization of VR sessions based on a number of VR session requests. In some instances, a plurality of individuals may be participating in similar VR environments. Aggregation of these VR session instances and their respective environments would allow the plurality of users to interact with one another in a social manner as they together participate in a shared VR environment.

However, because different VR sessions and environments have dissimilar objects and environments, merging of a plurality of VR environments may result in a number of elements within the merged VR environments being unrecognizable to a number of the users. This differences in the two VR environments to be merged may result in additional VR environment elements within a merged VR environment, or elements within the merged VR environment being lost, added or changed. This may, in turn, result in the users becoming disoriented within the merged VR environment. For example, one VR environment may include a "mountain walk" in which participants may walk within a mountain landscape virtual environment. In a first user's VR environment, a particular mountain may be placed at a particular coordinate position within the first user's VR environment. In contrast, a second user's VR environment may not include that particular mountain or may include that particular mountain in a different location than in the first user's VR environment. If the first user's VR environment and the second user's VR environment were merged, the merged VR environment may present the mountain in a position at which the first user is expecting it to be located, but this may disorient the second user and create a diminished experience for the second user. Therefore, a method of merging VR environments to ensure that the users are not disoriented and to provide as similar of a merged VR environment as possible is described herein.

As used in the present specification and in the appended claims, the term "virtual reality" is meant to be understood broadly as any computer-generated scenario that stimulates experience. Virtual reality may include any device that provides a user with visual, auditory, somatosensory, gustationary, or olfactory feedback and interaction, or other sensory feedback and interaction. Virtual reality includes types of augmented reality (AR), mixed reality (MR), virtual reality systems and methods that use hardware such as head-mounted displays, handheld devices, backpack devices, body suits, and other hardware and associated software, among other types of computer-generated scenarios.

In the following description, for purposes of explanation, numerous specific details are set forth in order to provide a thorough understanding of the present systems and methods. It will be apparent, however, to one skilled in the art, that the present apparatus, systems, and methods may be practiced without these specific details. Reference in the specification to "an example" or similar language means that a particular feature, structure, or characteristic described in connection with that example is included as described, but may not be included in other examples.

As noted above, aggregation of VR sessions and environments reduce the load on computing resources of the VR system and allow for users to have a shared social experience vis-à-vis merged VR sessions and environments. Referring now to the figures, FIG. 1 is a block diagram of a system (100) for aggregating virtual reality (VR) sessions, according to an example of the principles described herein. The system (100) may include a server computing device (101) to support a plurality of VR requests (151-1, 151-2, 151-n, collectively referred to herein as 151). The VR requests (151) originate from VR environments (150-1, 150-2, 150-n, collectively referred to herein as 150) as users activate their respective VR systems (152-1, 152-2, 152-n, collectively referred to herein as 152). These VR systems (152) may include, for example, head-mounted displays, handheld devices, backpack devices, body suits, and other hardware and associated software used to create an instance of a VR environment (150). Creation of the VR environments (150) creates a VR session, and the VR requests (151) are sent to the server computing device (101) for handling by the server computing device (101). A network connection for the server computing device (101) couples to a plurality of the VR systems (152) to form the plurality of VR environments (150). The server computing device (101) creates a network connection for the server computing device (101) to couple to a plurality of VR systems including VR devices (152) to form a plurality of VR environments (150).

To achieve its desired functionality, the server computing device (101) includes various hardware components. Among these hardware components may be a number of processors (102) and a number of data storage devices (103). These hardware components may be interconnected through the use of a number of buses and/or network connections. In one example, the processor (102) and data storage device (103) may be communicatively coupled via a bus (110).

The data storage device (103) stores data, such as executable program code, that is executed by the processor (102) or other processing device. As will be discussed, the data storage device (103) may specifically store computer code representing a number of applications that the processor (102) executes to implement at least the functionality described herein.

The data storage device (103) comprises a computer readable medium, a computer readable storage medium, or a non-transitory computer readable medium, among others. For example, the data storage device (103) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The server computing device (101) may include a similarity engine (120) stored in the data storage device (103) and executable by the processor (102) to determine a similarity between a first VR request (151-1) and a second VR request (151-2). "Similar" and its derivative grammatical terms may be defined herein as any characteristic within the first VR request (151-1) and the second VR request (151-2) that are shared characteristics. For example, the following characteristics may be similar between the first VR request (151-1) and a second VR request (151-2): the title of the VR environment, objects within the VR environment, the type of VR environment, the actions that may be taken within the VR environment, the plot of the VR environment, the setting of the VR environment, the relationships between participants in the VR environment, atmospheres of the VR environment, colors presented within the VR environment, if the VR environments considered as candidates for merging have been previously merged, other characteristics of the VR environments, and combinations thereof.

The similarity engine (120) determines a similarity between a first VR request (151-1) and a second VR request (151-2). Within FIG. 1 as well as FIGS. 2 and 3, three VR requests (151) and associated VR environments (150) and VR devices (152) are depicted. However, "n" in 105-n, 151-n, and 152-n and the ellipsis between the second VR environment (150-2) and the nth VR environment (150-n) denotes that any number of VR requests (151). VR environments (150), and VR devices (152) may be included and processed by the server computing device (101) within the system (100). In fact, unlike other computing devices, the server computing device (101) may possess the computing resources and computing power to process of hundreds or thousands of separate VR requests (151), VR environments (150), and VR devices (152).

The similarity engine (120) finds similarities between VR requests (151) and VR environments (150) a seeks to aggregate or merge these similar VR requests (151) and VR environments (150). Looking for and merging VR requests (151) and VR environments (150) is beneficial for a studied set of VR sessions because merging a plurality of VR requests (151) and VR environments (150) reduces the load on the computing resources of the server computing device (101), and allows for more users of the system (100) to participate in virtual reality experiences. In another example, two server computing devices (101) may each be executing a VR environment (150). In order to reduce the load of one of the two server computing devices (101), a VR environment (150) from one server computing device (101) may be handed over to the second server computing device (101) and merged on the second computing device (101). This reduces the load on the computing resources of the first server computing device (101).

In one example, the similarity engine (120) may determine that a plurality of VR requests (151) and VR environments (150) are similar based on social affinity data from a social graph may be extracted. In this example, the similarity engine (120) may check for a threshold match between users of the VR devices (152). For example, the centrality of a first user and a second user on a social graph may indicate a 90% fit between the first user and the second user. In this example, the associated VR sessions including their respective VR environments (150) are candidates for further feasibility analysis of a merge between the two VR environments (150). In one example, the social graph may be obtained from a social network, and the social affinity may be determined based on the social relationship and/or the level of a social relationship between the first user and the second user as defined by the social graph.

Figure 3:
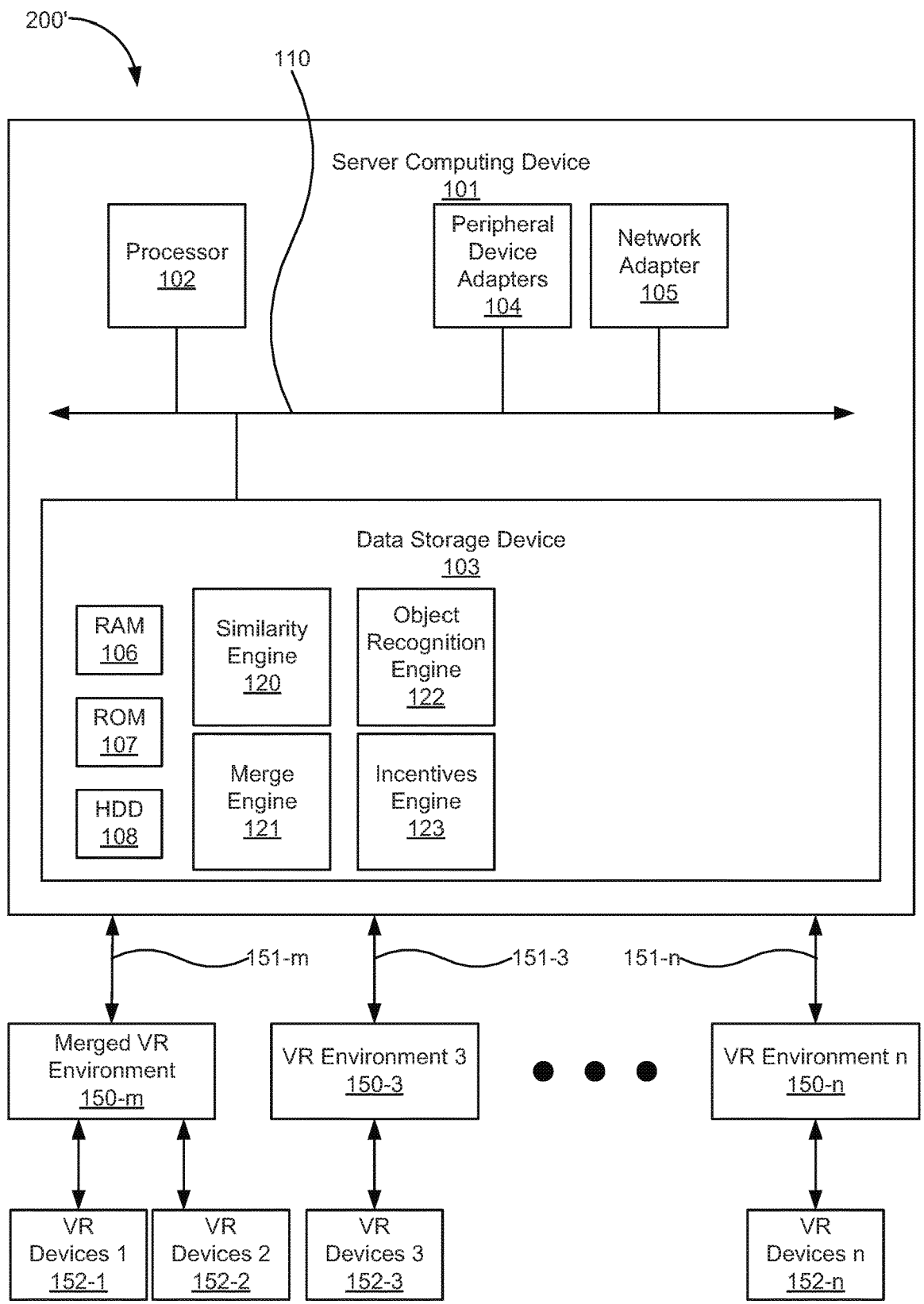
FIG. 3 is a block diagram of a system for aggregating virtual reality (VR) sessions after a merging of two VR environments, according to another example of the principles described herein.

In another example, the similarity engine (120) may determine that a plurality of VR requests (151) and VR environments (150) are similar based on historical occurrence data that indicates that the VR requests (151) and VR environments (150) have been merged before at least one other time. This historical occurrence data demonstrates a high statistical likelihood for the VR environments (150) being considered for merging should be merged. For example, based on past merging of VR environments (150), the similarity engine (120) executed by the processor (102) may determine that a first user's VR environment (150-1) has been previously merged with a second user's VR environment (150-2). In this example, the similarity engine (120) may determine that the first and second user's VR environments (150) may be merged in subsequent instances as well. In another example, the similarity engine (120) may determine that the first user and the second user have previously given explicit or implicit feedback that merged VR environment (FIG. 3, 150-*m*) met expectations as to quality of the merged VR environment (FIG. 3, 150-*m*). In this example, the similarity engine (120) may indicate that such a merged VR environment (FIG. 3, 150-*m*) is appropriate and merge the first and second users' VR environments (150) based on this information in subsequent instances.

In contrast to the above example, the similarity engine (120) may, based on past merging of VR environments (150), determine that a first user's VR environment (150-1) has been previously merged with a second user's VR environment (150-2), but that such a merging caused a performance event that resulted in a degraded user experience. In this example, the similarity engine (120) may determine that the first and second user's VR environments (150) should not be merged in subsequent instances as well.

Further, the similarity engine (120) may determine that a plurality of VR requests (151) and VR environments (150) should be merged based on real time monitoring of the VR environments (150) reveals an indicator of a likely aggregation possibility of at least two of the VR environments (150) in a given period of time. The real-time factors that may be considered in determining similarity and appropriate merging may include, for example, similarity in VR environments, context of the VR environments (150), timing of the VR environments (150), the social affinity of the users, users' explicit or implicit instructions, other factors, and combinations thereof. Further, the similarity engine (120) may consider input from a social network regarding explicit instructions to merge the VR environments (150) or implicit instructions to merge the VR environments (150) based on the social affinity of the users within the social network.

In one example, the timing of when the users initiate their respective VR environments (150) may be considered. For example, a first user may want to participate in a mountain walk simulation provided through the VR environments (150), and a second user may have just began participating in the same or a similar VR environment (150) moments before the first user initiated his or her VR environment (150). In this example, the VR environments (150) may be merged.

In another example, the merging of these VR environments (150) may be based on crowd sourcing of the similar VR environments (150) and/or social relationships similar between the first user and the second user. In this example, if individuals within a group make similar requests through crowdsourcing the group including, for example, members of a social network, the VR environments of these individuals may be merged.

In one example, the merging of VR environments (150) may be based on an invitation sent to a plurality of users. In this example, a first user and a second user may be invited to join each other in a merged VR environment (FIG. 3, 150-*m*). In one example, the invitation may be sent to the users when it is determined that the first or second user could benefit from time in a merged VR session. In this example, users may send information to the similarity engine (120) indicating that at least one of the users may benefit from the VR session by interacting with other individuals within a merged VR session. Further, the similarity engine (120) may send out invitations to the users that made the suggestion as well as the target user who is intended to benefit from the VR session. This example may arise in situations where the system (100) is used as a therapy tool, and a friend or medical professional makes the suggestion. Thus, the other users may begin the therapy VR session and the similarity engine may mark that VR session as a VR session to be merged when the target user activates his or her VR devices (152) and sends in a VR request (152) to the server computing device (101). In this manner, the merging of VR environments (150) may serve as a way to provide medical therapy to a target user.

The server computing device (101) may include a merge engine (121) to merge the first VR environment (150-1) supporting the first VR request (151-1) and a second VR environment (150-2) supporting the second VR request (151-2). The merge engine (121) merges the VR environments (150) which includes at least two VR environments (150) being merged together. When the VR environments (150) are merged, a number of objects and characteristics of the VR environments (150) may be altered at the outset or altered over time to ensure that the users participating in the merged VR environment (FIG. 3, 150-*m*) do not become disoriented within the merged VR environment (FIG. 3, 150-*m*).

When merging the VR environments (150), examples described herein may merge a first user's VR environment (150) into a second user's VR environment (150), merge the second user's VR environments (150) into the first user's VR environments (150), or combinations thereof where the two VR environments (150) to be merged both are adjusted in some manner. As described herein, changing an expected VR environment (150) including changing colors, locations of objects, number of objects, and other visual and interactive aspects of the VR environments (150), or doing so in an overly-drastic manner may result in a user becoming disoriented within the merged VR environment (FIG. 3, 150-*m*). Thus, the merge engine (121) and the object recognition engine (122) serve to merge the VR environments (150) in a manner in which the users are not disoriented within the merged VR environment (FIG. 3, 150-*m*).

When merging the VR environments (150), the processor (102) may execute the object recognition engine (122) to detect objects in a first VR environment (150-1) and a second VR environment (150-2). The object recognition engine (122) determines if the objects within the first VR environment (150-1) and the second VR environment (150-2) have an appropriate "distance" or similarity between one another to make a merging of the two VR environments (150-1, 150-2) appropriate. For example, the first VR environment (150-1) and the second VR environment (150-2) may be merged even though the two VR environments originally included an object such as a mountain that had a different color between the two VR environments (150-1, 150-2).

The determination as to how the distance between the two VR environments (150-1, 150-2) are to be addressed may be based on a number of factors including, for example, previous user exception handling for merged VR environments, an expected time the users are to be interacting within the merged VR environment (FIG. 3, 150-m), other factors, and combinations thereof. As to the previous user exception handling for merged VR environments, users may have, in past merged VR environments indicated that a number of changes to the expected VR environment did not have a significant impact on their experience within the merged VR environment. This data may be stored within the data storage device (103) for future use in similar instances of merging of VR environments (150).

As to the changes to be made to the merged VR environments in order to make the two VR environments (150-1, 150-2) identical, the system (100) may consider the expected time the users are to be interacting within the merged VR environment (FIG. 3, 150-m), and the changes may be made over an amount of time. For example, if a mountain within a mountain walk VR environment is a different color relative to another VR environment that includes the mountain, then the color may be changed gradually over the time the users are within the VR environment such that the users do not perceive the change or do not notice the change rather than immediately changing the color such that the user notices the change. For example, if the first user is expected to spend twenty minutes within the merged VR environment (FIG. 3, 150-m) and a second user is expected to spend forty minutes within the merged VR environment (FIG. 3, 150-m), then the merge engine (121) may use the shortest amount of time (twenty minutes) as a time frame in which the objects within the merged VR environment (FIG. 3, 150-m) are changed in order to merge the two VR environments (FIG. 3, 105-1 and 150-2). In this example, the merge engine (121) may cause the changes to be made to the VR environments (FIG. 3, 105-1 and 150-2) as they are merged to form the merged VR environment (FIG. 3, 150-m) within a time less than the twenty minutes such as, for example, ten minutes in order to merge the VR environments (FIG. 3, 105-1 and 150-2) before the end of the shortest time a user is to spend using the system (100) while still allowing the VR environments (FIG. 3, 105-1 and 150-2) to merge to form the merged VR environment (FIG. 3, 150-m) with little or no awareness from the users of the changes being made. In instances where the first user and the second user are expected to spend an equal amount of time in the merged VR environment (FIG. 3, 150-m), the changes may take place over a period of time shorter than the total amount of time the users are expected to spend within the merged VR environment (FIG. 3, 150-m).

When the merge engine (121) makes changes within the merged VR environment (FIG. 3, 150-m), the merge engine (121) may make changes in one or both VR environments (150-1, 150-2) that are to be merged. In one example, the merge engine (121) and the object recognition engine (122) may ascertain the objects within the merged VR environment (FIG. 3, 150-m) that are to be changed to meet a common denominator. Further, the merge engine (121) and the object recognition engine (122) may make changes to the merged VR environment (FIG. 3, 150-m), in a phased or gradual basis. For example, a first mountain included in the first VR environment (150-1) may be changed from a first color to a second color and the colors, shading and other aesthetic characteristics of the mountain may change gradually over a number of minutes before a fully merged VR environment (FIG. 3, 150-m) is realized. This gradual merge of elements within the VR environments (150-1, 150-2) into the merged VR environment (FIG. 3, 150-m) reduces or eliminates user disorientation within the merged VR environment (FIG. 3, 150-m). More regarding the merging of the VR environments (150) is described herein in connection with FIGS. 2 and 3.

The server computing device (101) may include computing resources including a processor (102) and data storage device (103). The similarity engine (120) and merge engine (121) are stored in the data storage device (103) and executed by the processor (102). Other engines described herein are similarly stored in the data storage device (103) and executed by the processor (102) as described herein in connection with the example of FIG. 2.

Figure 2:
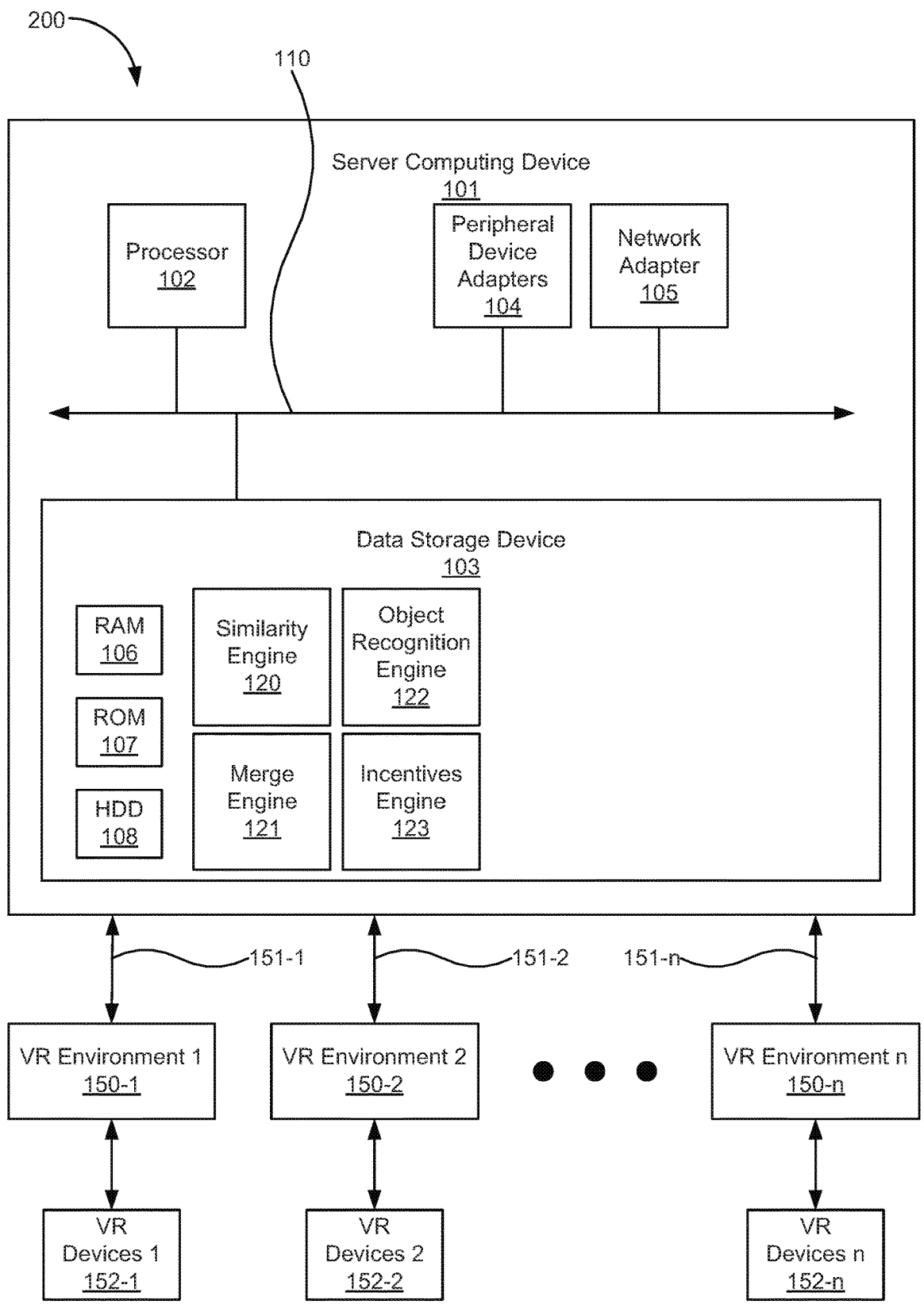
FIG. 2 is a block diagram of a system for aggregating virtual reality (VR) sessions, according to another example of the principles described herein.

FIG. 2 is a block diagram of a system (200) for aggregating virtual reality (VR) sessions, according to another example of the principles described herein. FIG. 3 is a block diagram of the system (100) for aggregating virtual reality (VR) sessions after a merging of two VR environments (150-1, 150-2), according to another example of the principles described herein.

To achieve its desired functionality, the server computing device (101) includes various hardware components. Among these hardware components may be a number of processors (102), a number of data storage devices (103), a number of peripheral device adapters (104), and a number of network adapters (105). These hardware components may be interconnected through the use of a number of buses and/or network connections. In one example, the processor (102), data storage device (103), peripheral device adapters (104), and a network adapter (105) may be communicatively coupled via a bus (110).

The data storage device (103) stores data, such as executable program code, that is executed by the processor (102) or other processing device. As will be discussed, the data storage device (103) may specifically store computer code representing a number of applications that the processor (102) executes to implement at least the functionality described herein.

The data storage device (103) may include various types of memory modules, including volatile and nonvolatile memory. For example, the data storage device (103) of the present example includes Random Access Memory (RAM) (106), Read Only Memory (ROM) (107), and Hard Disk Drive (HDD) memory (108). Many other types of memory may also be utilized, and the present specification contemplates the use of as many varying type(s) of memory in the data storage device (103) as may suit a particular application of the principles described herein. In certain examples, different types of memory in the data storage device (103) may be used for different data storage needs. For example, in certain examples, the processor (102) may boot from Read Only Memory (ROM) (107), maintain nonvolatile storage in the Hard Disk Drive (HDD) memory (108), and execute program code stored in Random Access Memory (RAM) (106).

The data storage device (103) comprises a computer readable medium, a computer readable storage medium, or a non-transitory computer readable medium, among others. For example, the data storage device (103) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (104, 105) in the server computing device (101) enable the processor (102) to interface with various other hardware elements, external and internal to the server computing device (101). For example, the peripheral device adapters (104) may provide an interface to input/output devices, such as, for example, a display device, a mouse, or a keyboard. The peripheral device adapters (104) may also provide access to other external devices, such as an external storage device, a number of network devices such as, for example, servers, switches, and routers, client devices, other types of computing devices, and combinations thereof.

The server computing device (101) includes a number of engines used in the implementation of generating merging VR environments. The various engines within the server computing device (101) include executable program code that may be executed separately. In this example, the various engines may be stored as separate computer program products. In another example, the various engines within the server computing device (101) may be combined within a number of computer program products; each computer program product includes a number of the engines.

For example, the similarity engine (120) determines a similarity between a first VR request (151-1) and a second VR request (151-2). Within the drawings, three VR requests (151) and associated VR environments (150) and VR devices (152) are depicted. However, "n" in 105-n, 151-n, and 152-n and the ellipsis between the second VR environment (150-2) and the nth VR environment (150-n) denotes that any number of VR requests (151), VR environments (150), and VR devices (152) may be included and processed by the server computing device (101) within the system (100). In fact, unlike other computing devices, the server computing device (101) may possess the computing resources and computing power to process of hundreds or thousands of separate VR requests (151), VR environments (150), and VR devices (152).

The similarity engine (120) finds similarities between VR requests (151) and VR environments (150) a seeks to aggregate or merge these similar VR requests (151) and VR environments (150). Looking for and merging VR requests (151) and VR environments (150) is beneficial for a studied set of VR sessions because merging a plurality of VR requests (151) and VR environments (150) reduces the load on the computing resources of the server computing device (101), and allows for more users of the system (100) to participate in virtual reality experiences. In another example, two server computing devices (101) may each be executing a VR environment (150). In order to reduce the load of one of the two server computing devices (101), a VR environment (150) from one server computing device (101) may be handed over to the second server computing device (101) and merged on the second computing device (101). This reduces the load on the computing resources of the first server computing device (101).

In one example, the similarity engine (120) may determine that a plurality of VR requests (151) and VR environments (150) are similar based on social affinity data from a social graph may be extracted. In this example, the similarity engine (120) may check for a threshold match between users of the VR devices (152). For example, the centrality of a first user and a second user on a social graph may indicate a 90% fit between the first user and the second user. In this example, the associated VR sessions including their respective VR environments (150) are candidates for further feasibility analysis of a merge between the two VR environments (150). In one example, the social graph may be obtained from a social network, and the social affinity may be determined based on the social relationship and/or the level of a social relationship between the first user and the second user as defined by the social graph.

In another example, the similarity engine (120) may determine that a plurality of VR requests (151) and VR environments (150) are similar based on historical occurrence data that indicates that the VR requests (151) and VR environments (150) have been merged before at least one other time. This historical occurrence data demonstrates a high statistical likelihood for the VR environments (150) being considered for merging should be merged. For example, based on past merging of VR environments (150), the similarity engine (120) executed by the processor (102) may determine that a first user's VR environment (150-1) has been previously merged with a second user's VR environment (150-2). In this example, the similarity engine (120) may determine that the first and second user's VR environments (150) may be merged in subsequent instances as well. In another example, the similarity engine (120) may determine that the first user and the second user have previously given explicit or implicit feedback that merged VR environment (FIG. 3, 150-$m$) met expectations as to quality of the merged VR environment (FIG. 3, 150-$m$). In this example, the similarity engine (120) may indicate that such a merged VR environment (FIG. 3, 150-$m$) is appropriate and merge the first and second users' VR environments (150) based on this information in subsequent instances.

In contrast to the above example, the similarity engine (120) may, based on past merging of VR environments (150), determine that a first user's VR environment (150-1) has been previously merged with a second user's VR environment (150-2), but that such a merging caused a performance event that resulted in a degraded user experience. In this example, the similarity engine (120) may determine that the first and second user's VR environments (150) should not be merged in subsequent instances as well.

Further, the similarity engine (120) may determine that a plurality of VR requests (151) and VR environments (150) should be merged based on real time monitoring of the VR environments (150) reveals an indicator of a likely aggregation possibility of at least two of the VR environments (150) in a given period of time. The real-time factors that may be considered in determining similarity and appropriate merging may include, for example, similarity in VR environments, context of the VR environments (150), timing of the VR environments (150), the social affinity of the users, users' explicit or implicit instructions, other factors, and combinations thereof. Further, the similarity engine (120) may consider input from a social network regarding explicit instructions to merge the VR environments (150) or implicit instructions to merge the VR environments (150) based on the social affinity of the users within the social network.

In one example, the timing of when the users initiate their respective VR environments (150) may be considered. For example, a first user may want to participate in a mountain walk simulation provided through the VR environments (150), and a second user may have just began participating in the same or a similar VR environment (150) moments before the first user initiated his or her VR environment (150). In this example, the VR environments (150) may be merged.

In another example, the merging of these VR environments (150) may be based on crowd sourcing of the similar VR environments (150) and/or social relationships similar between the first user and the second user. In this example, if individuals within a group make similar requests through crowdsourcing the group including, for example, members of a social network, the VR environments of these individuals may be merged.

In one example, the merging of VR environments (150) may be based on an invitation sent to a plurality of users. In this example, a first user and a second user may be invited to join each other in a merged VR environment (FIG. 3, 150-*m*). In one example, the invitation may be sent to the users when it is determined that the first or second user could benefit from time in a merged VR session. In this example, users may send information to the similarity engine (120) indicating that at least one of the users may benefit from the VR session by interacting with other individuals within a merged VR session. Further, the similarity engine (120) may send out invitations to the users that made the suggestion as well as the target user who is intended to benefit from the VR session. This example may arise in situations where the system (100) is used as a therapy tool, and a friend or medical professional makes the suggestion. Thus, the other users may begin the therapy VR session and the similarity engine may mark that VR session as a VR session to be merged when the target user activates his or her VR devices (152) and sends in a VR request (152) to the server computing device (101). In this manner, the merging of VR environments (150) may serve as a way to provide medical therapy to a target user.

Once a plurality of VR environments (150) are marked for aggregation or merging by the similarity engine (120), the merge engine (121), an object recognition engine (122), and an incentives engine may be executed by the processor (102) to merge the VR environments (150). FIG. 3 is a block diagram of the system (100) for aggregating virtual reality (VR) sessions after a merging of two VR environments (150-1, 150-2), according to another example of the principles described herein. FIG. 3 depicts the outcome of the merge engine (121) after the merge of the first VR environment (150-1) and the second VR environment (150-2) is executed. Specifically, FIG. 3 depicts a merged VR environment (150-*m*) with the VR devices (152-1, 152-2) of the first VR environment (150-1) and the second VR environment (150-2) being input devices to the merged VR environment (150-*m*).

When merging the VR environments (150), examples described herein may merge a first user's VR environment (150) into a second user's VR environment (150), merge the second user's VR environments (150) into the first user's VR environments (150), or combinations thereof where the two VR environments (150) to be merged both are adjusted in some manner. As described herein, changing an expected VR environment (150) including changing colors, locations of objects, number of objects, and other visual and interactive aspects of the VR environments (150), or doing so in an overly-drastic manner may result in a user becoming disoriented within the merged VR environment (FIG. 3, 150-*m*). Thus, the merge engine (121) and the object recognition engine (122) serve to merge the VR environments (150) in a manner in which the users are not disoriented within the merged VR environment (FIG. 3, 150-*m*).

When merging the VR environments (150), the processor (102) may execute the object recognition engine (122) to detect objects in a first VR environment (150-1) and a second VR environment (150-2). The object recognition engine (122) determines if the objects within the first VR environment (150-1) and the second VR environment (150-2) have an appropriate "distance" or similarity between one another to make a merging of the two VR environments (150-1, 150-2) appropriate. For example, the first VR environment (150-1) and the second VR environment (150-2) may be merged even though the two VR environments originally included an object such as a mountain that had a different color between the two VR environments (150-1, 150-2).

The determination as to how the distance between the two VR environments (150-1, 150-2) are to be addressed may be based on a number of factors including, for example, previous user exception handling for merged VR environments, an expected time the users are to be interacting within the merged VR environment (FIG. 3, 150-*m*), other factors, and combinations thereof. As to the previous user exception handling for merged VR environments, users may have, in past merged VR environments indicated that a number of changes to the expected VR environment did not have a significant impact on their experience within the merged VR environment. This data may be stored within the data storage device (103) for future use in similar instances of merging of VR environments (150).

As to the changes to be made to the merged VR environments in order to make the two VR environments (150-1, 150-2) identical, the system (100) may consider the expected time the users are to be interacting within the merged VR environment (FIG. 3, 150-*m*), and the changes may be made over an amount of time. For example, if a mountain within a mountain walk VR environment is a different color relative to another VR environment that includes the mountain, then the color may be changed gradually over the time the users are within the VR environment such that the users do not perceive the change or do not notice the change rather than immediately changing the color such that the user notices the change. For example, if the first user is expected to spend twenty minutes within the merged VR environment (FIG. 3, 150-*m*) and a second user is expected to spend forty minutes within the merged VR environment (FIG. 3, 150-*m*), then the merge engine (121) may use the shortest amount of time (twenty minutes) as a time frame in which the objects within the merged VR environment (FIG. 3, 150-*m*) are changed in order to merge the two VR environments (FIG. 3, 105-1 and 150-2). In this example, the merge engine (121) may cause the changes to be made to the VR environments (FIG. 3, 105-1 and 150-2) as they are merged to form the merged VR environment (FIG. 3, 150-m) within a time less than the twenty minutes such as, for example, ten minutes in order to merge the VR environments (FIG. 3, 105-1 and 150-2) before the end of the shortest time a user is to spend using the system (100) while still allowing the VR environments (FIG. 3, 105-1 and 150-2) to merge to form the merged VR environment (FIG. 3, 150-m) with little or no awareness from the users of the changes being made. In instances where the first user and the second user are expected to spend an equal amount of time in the merged VR environment (FIG. 3, 150-m), the changes may take place over a period of time shorter than the total amount of time the users are expected to spend within the merged VR environment (FIG. 3, 150-m).

When the merge engine (121) makes changes within the merged VR environment (FIG. 3, 150-m), the merge engine (121) may make changes in one or both VR environments (150-1, 150-2) that are to be merged. In one example, the merge engine (121) and the object recognition engine (122) may ascertain the objects within the merged VR environment (FIG. 3, 150-m) that are to be changed to meet a common denominator. Further, the merge engine (121) and the object recognition engine (122) may make changes to the merged VR environment (FIG. 3, 150-m), in a phased or gradual basis. For example, a first mountain included in the first VR environment (150-1) may be changed from a first color to a second color and the colors, shading and other aesthetic characteristics of the mountain may change gradually over a number of minutes before a fully merged VR environment (FIG. 3, 150-m) is realized. This gradual merge of elements within the VR environments (150-1, 150-2) into the merged VR environment (FIG. 3, 150-m) reduces or eliminates user disorientation within the merged VR environment (FIG. 3, 150-m).

In one example, the similarity engine (120) may identify mergeable VR environments (150), and the merge engine (121) and the object recognition engine (122) may merge the VR environments (150) based on user associations or relationships such as, for example, a gaming community that the users are a part of. In these examples, the VR environments (150) that are merged may be identified based on the relationships the users have within the community. For example, in a sandbox VR environment where users that are members of this community are allowed to create and manipulate the VR environment, the objects may be merged as acceptable by the users of the sandbox VR environment community. In one example, the users, as members of the community, may have different susceptibilities where the users as architects more easily identify the merging of an object than in other VR environments. In these examples, the manner in which the engines (120, 121, 122) merge the VR environments may be made more or less conservatively based on the community's tolerances to changes.

In one example, the system (100) may offer incentives to users to participate in a merged VR environment (FIG. 3, 150-m) by executing the incentives engine (123). The incentives engine (123), when executed by the processor (102), may offer incentives to a number of users. The incentives may include, for example, subscriptions to use the system (100), monetary incentives, and gift incentives, among other types of incentives. The incentives may be provided in exchange for obtaining information from the users regarding their experience within a merged VR environment (150-m), in exchange for the ability to glean data or metadata from the merged VR environment (150-m). This allows the system (100) to better understand the merged scenario within the merged VR environment (150-m) and improve on the manner in which merging may occur.

FIG. 3 depicts a new VR environment (150-3) with an associated VR request (151-3) and VR devices (152-3) that are used within the VR environment (150-3). This new VR environment (150-3) is depicted to show that other VR environments (150) may be created or executed during the merging of two or more other VR environments (150).

Figure 4:
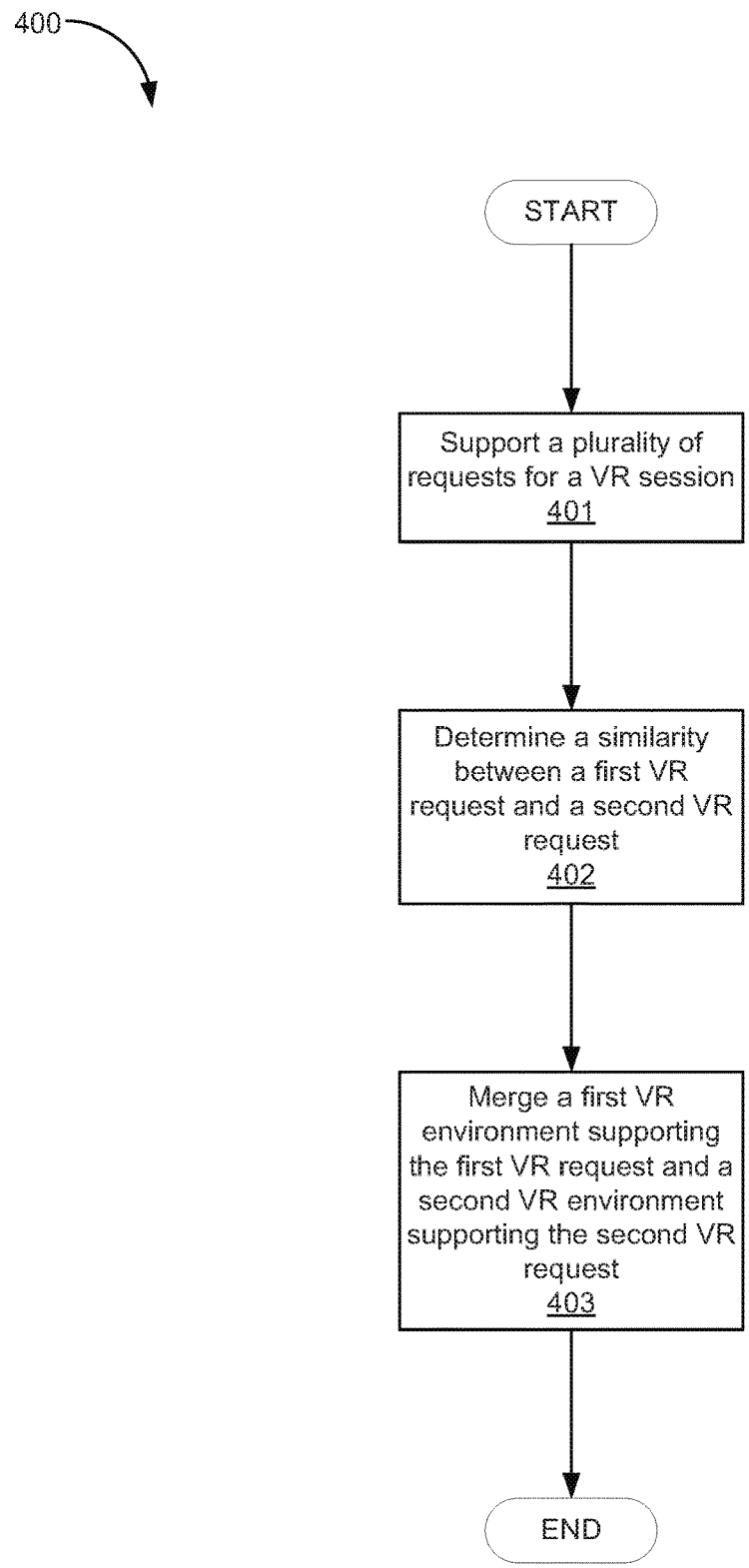
FIG. 4 is a flowchart showing a method of aggregating virtual reality (VR) sessions, according to an example of the principles described herein.

Having described the elements of the systems (100, 200) in FIGS. 1, 2, and 3, an example of operation of the system (100, 200) will now be described in connection with FIGS. 4 and 5. FIG. 4 is a flowchart (400) showing a method of aggregating virtual reality (VR) sessions, according to an example of the principles described herein. The method (400) may include supporting (block 401) a plurality of requests (151) for a VR session. A first user of the system (100, 200) may activate the system (100, 200) by activating his or her respective VR devices (152) and sending a VR request (151) to the server computing device (101).

A similarity between a first VR request (151-1) and its associated VR environment (150-1) and a second VR request (151-2) and its associated VR environment (150-2) is determined (block 402) by executing the similarity engine (120). The server computing device (101), executing the similarity engine (120), may detect the first user and may determine that the first user's VR environment (150-1) may be a candidate for merging with another VR environment (150-2). The similarity engine (120) may determine this based on calendaring and scheduling of the first user's VR environment (150-1), via interaction with an artificial intelligence (AI) assistant, through statistical monitoring of past merges of VR environments (150), other criteria, or combinations thereof.

The merge engine (121) and object recognition engine (122) may be executed to merge (block 403) the first VR environment (150-1) supporting the first VR request (151-1) and the second VR environment (150-2) supporting the second VR request (151-2). The system (100, 200), executing the merge engine (121), may populate an understanding of the likely timing of the phases the merging of the first user's VR environment (150-1) with another VR environment (150-2) based on statistical analysis. For example, the merge engine (121) may determine that the first user's VR environment (150-1) may utilize a first color for a first object for fourteen minutes and then the first object will be presented using a second color. The system (100, 200) may then switch the first user's VR environment (150-1) to the merged VR environment (150-m) where a representation of the first object is presented in a normalized color; the second color.

The object recognition engine (122) captures terminus images or key frames of each of the target objects within the first user's VR environment (150-1). Using the object recognition services of the object recognition engine (122) such as, for example, OpenCV computer vision programming developed and distributed by Intel Corporation, the object recognition engine (122) recognizes the objects in frame and from that recognition, ascertains allowable or likely visual variations that may be presented in the merged VR environment (150-m). The merge engine (121) ascertains, based on the timings of the VR environments (150), the manner in which the VR environments (150) are to be normalized with respect to one another, and the "distance" between any two objects in the different VR environments (150), whether there is likely going to be an adequate merged experience for the first user and other users whose VR environments (150)

are to be merged with the first user's VR environment (150-1). The merge engine (121) and an object recognition engine (122) understand the sensitivities of different distances based on past aggregate or studied user behavior. The merge engine (121) and an object recognition engine (122) may use this sensitivity as a starting point for managing the merge of the VR environments (150). A record may be stored on the data storage device (103). A table depicting an example of that record may look as follows:

TABLE 1

Sample Merge Record

| | |
|---|---|
| Context | Mountain Walk-High Quality |
| Classification | Scenic |
| Likely Merged VR Environments | VR session 1 and VR session 23 |
| Transition Time | 239 seconds |
| Social Network Centrality | 96% |
| Exception Handling | Mountain Color (change event) |
| Access Control | Allowable for both VR sessions |
| Recommendation | Merge session |
| UserID | User59 |

As depicted in Table 1, the context to which the to-be-merged VR environments (150) have is a high-quality mountain walk with a classification as a scenic VR environment. The two VR environments (150) the system (100, 200) has determined to merge are denoted as VR session 1 and VR session 23 with their respective VR environments (150). The transition time the system (100, 200) has determined it would take for the two VR environments (150) to completely merge is 239 seconds, and the social network centrality between the two users whose VR environments (150) are to be merged may define their relationship in a social network as a 93% match. The exception handling or objects the system (100, 200) will change is the color of a mountain within the merged VR environment (150-m). The recommendation the system (100, 200) has provided is to merge the two VR environments (150). The user identification (UserID) identifies the user whose VR environment is to be merged as User59.

In one example, the object recognition engine (122) of the server computing device (101) may place a limit on the object recognition to, for example, the first five recognized objects. In another example, the object recognition engine (122) may impose a constraint related to the limits of the hardware such as the limits of the processor (102) being able to process the merging of the five objects simultaneously. Thus, the abilities of the server computing device (101) in being able to process this data may be weighted in connection with the manner in which recognition of more objects may impact the users' perceptions of framerate quality within the merged VR environment (150-m)

Figure 5:
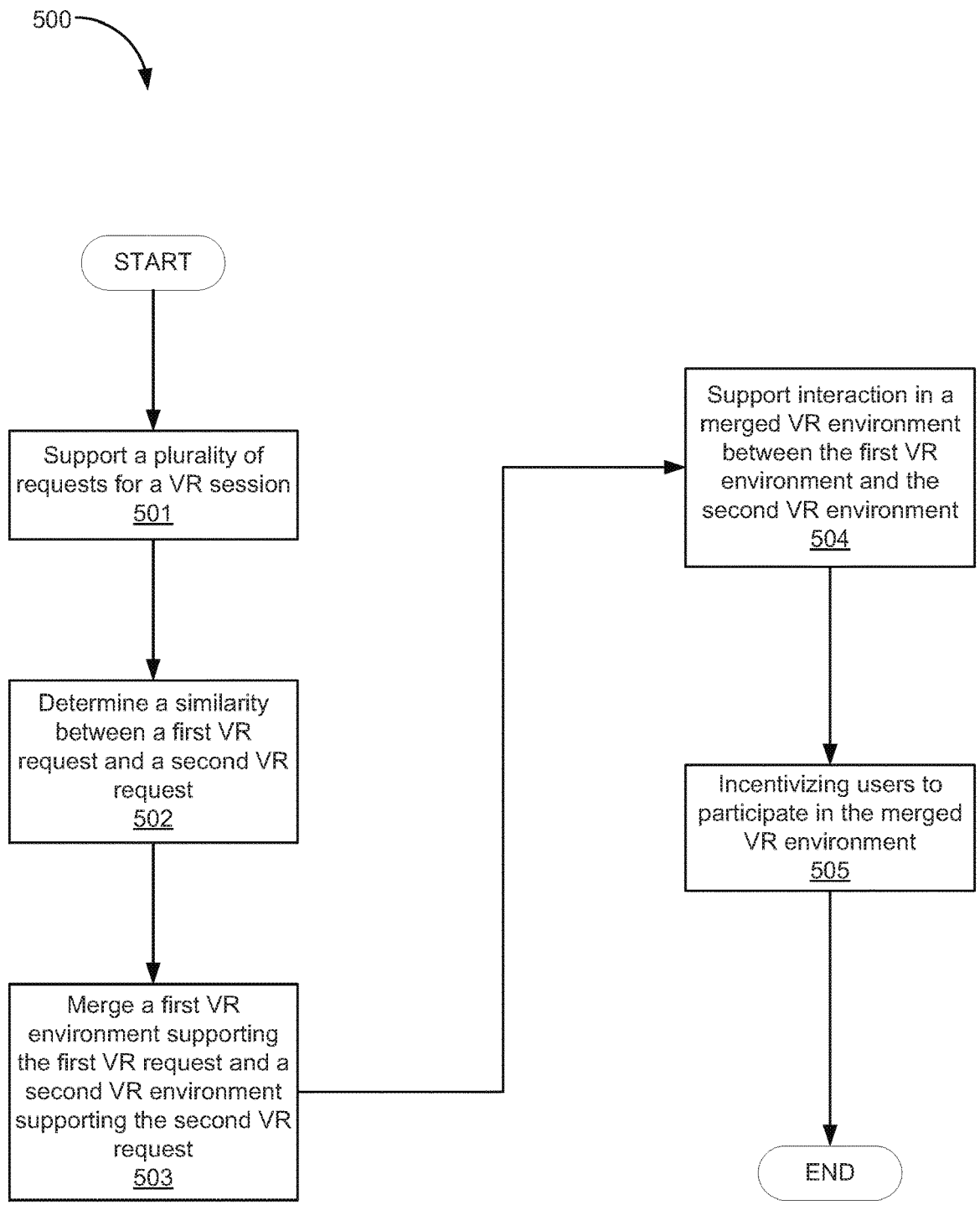
FIG. 5 is a flowchart showing a method of aggregating virtual reality (VR) sessions, according to another example of the principles described herein.

FIG. 5 is a flowchart showing a method (500) of aggregating virtual reality (VR) sessions, according to another example of the principles described herein. As described above in connection with the method of FIG. 4, the method (500) may include supporting (block 501) a plurality of requests (151) for a VR session. A similarity between a first VR request (151-1) and its associated VR environment (150-1) and a second VR request (151-2) and its associated VR environment (150-2) is determined (block 502) by executing the similarity engine (120). The merge engine (121) and object recognition engine (122) may be executed to merge (block 503) the first VR environment (150-1) supporting the first VR request (151-1) and the second VR environment (150-2) supporting the second VR request (151-2).

FIG. 5 may also include supporting (block 504) interaction within the merged VR environment (150-m). Further, the method (500) of FIG. 5 may include incentivizing (block 505) users to participate in the merged VR environment.

Merging (block 503) the first VR environment (150-1) supporting the first VR request (151-1) and the second VR environment (150-2) supporting the second VR request (151-2) may include merging the first VR environment (150-1) and the second VR environment (150-2) in response to a determination that at least one similarity criteria between the first VR environment (150-1) and the second VR environment (150-2) exists. The similarity criteria may include a determination of how closely connected a first user submitting the first request (151-1) is with a second user submitting the second request (151-2) within a social network, an extent to which the first VR environment (150-1) and the second VR environment (150-2) include matching content, an identification of a common object in the first VR environment (150-1) and the second VR environment (150-2), and combinations thereof. Merging the first VR environment (150-1) and the second VR environment (150-2) may include merging the first VR environment (150-1) and the second VR environment (150-2) over a period of time.

Figure 6:
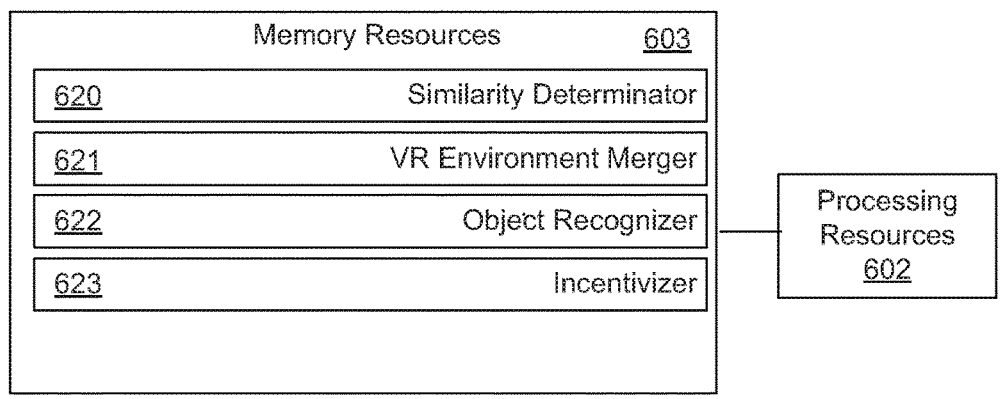
FIG. 6 is a block diagram of an example a virtual reality (VR) session aggregator, according to one example of principles described herein.

FIG. 6 is a block diagram of an example a virtual reality (VR) session aggregator (600), according to one example of principles described herein. The VR session aggregator (600) may be a part of or may represent the systems (100, 200) described in connection with FIGS. 1 through 3. The VR session aggregator (600) may include processing resources (602) that are in communication with memory resources (603). Processing resources (602) include at least one processor and other resources used to process programmed instructions. The memory resources (603) represent any memory capable of storing data, such as programmed instructions or data structures used by the VR session aggregator (600). The programmed instructions shown stored in the memory resources (603) include a similarity degerminator (620), a VR environment merger (621), an object recognizer (622), and an incentivizer (623).

The memory resources (603) include a computer readable storage medium that contains computer readable program code to cause tasks to be executed by the processing resources (602). The computer readable storage medium may be a tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, other types of memory, or combinations thereof.

The similarity degerminator (620) represents programmed instructions that, when executed, cause the processing resource (602) to determine a similarity between a first VR request (151-1) and a second VR request (151-2). The similarities may be any characteristic within the first VR request (151-1) and the second VR request (151-2) that are shared characteristics.

The VR environment merger (621) represents programmed instructions that, when executed, cause the processing resource (602) to merge the first VR environment (150-1) supporting the first VR request (151-1) and a second VR environment (150-2) supporting the second VR request (151-2). The VR environment merger (621) merges the VR environments (150) which includes at least two VR environments (150) being merged together.

The object recognizer (622) represents programmed instructions that, when executed, cause the processing resource (602) to detect objects in a first VR environment (150-1) and a second VR environment (150-2). The object recognizer (622) determines if the objects within the first VR environment (150-1) and the second VR environment (150-2) have an appropriate "distance" or similarity between one another to make a merging of the two VR environments (150-1, 150-2) appropriate.

The incentivizer (623) represents programmed instructions that, when executed, cause the processing resource (602) to offer incentives to a number of user. Incentivizing users allows the VR session aggregator (600) to better understand the merged scenario within the merged VR environment (150-m) and improve on the manner in which merging may occur.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The server computing device (101) within the examples described herein may be utilized in any data-processing scenario, including stand-alone hardware, mobile applications, a computing network, or combinations thereof. Further, the server computing device (101) may be used in a computing network, a public cloud network, a private cloud network, a hybrid cloud network, other forms of networks, or combinations thereof. In one example, the methods provided by the server computing device (101) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the server computing device (101) are executed by a local administrator.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
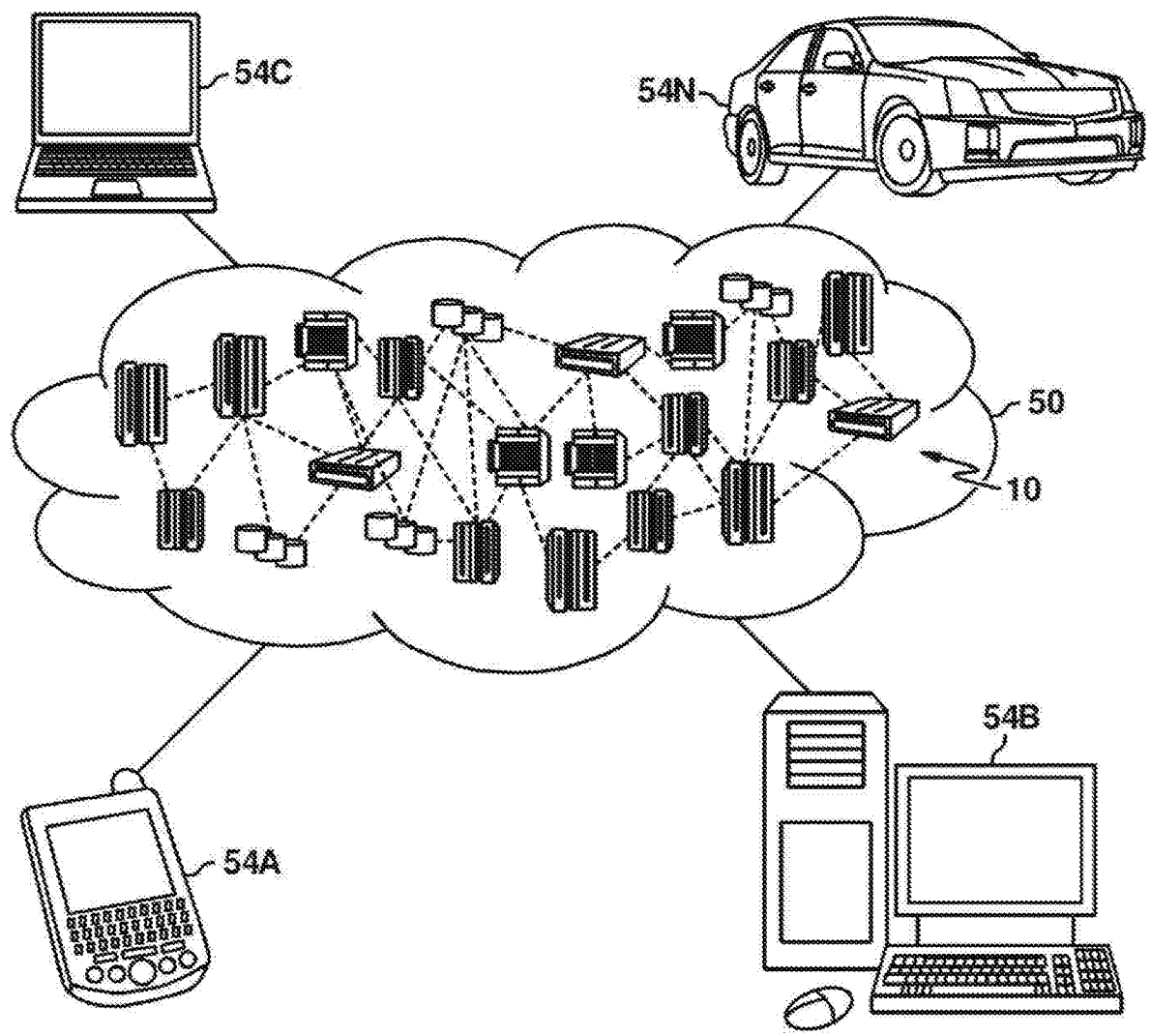
FIG. 7 is a cloud computing environment, according to one example of principles described herein.

Referring now to FIG. 7, illustrative cloud computing environment (50) is depicted. As shown, cloud computing environment (50) includes one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 7 are intended to be illustrative only and that computing nodes (10) and cloud computing environment (50) can communicate with any type of computerized device over any type of network and/or network addressable connection (e.g., using a web browser).

Figure 8:
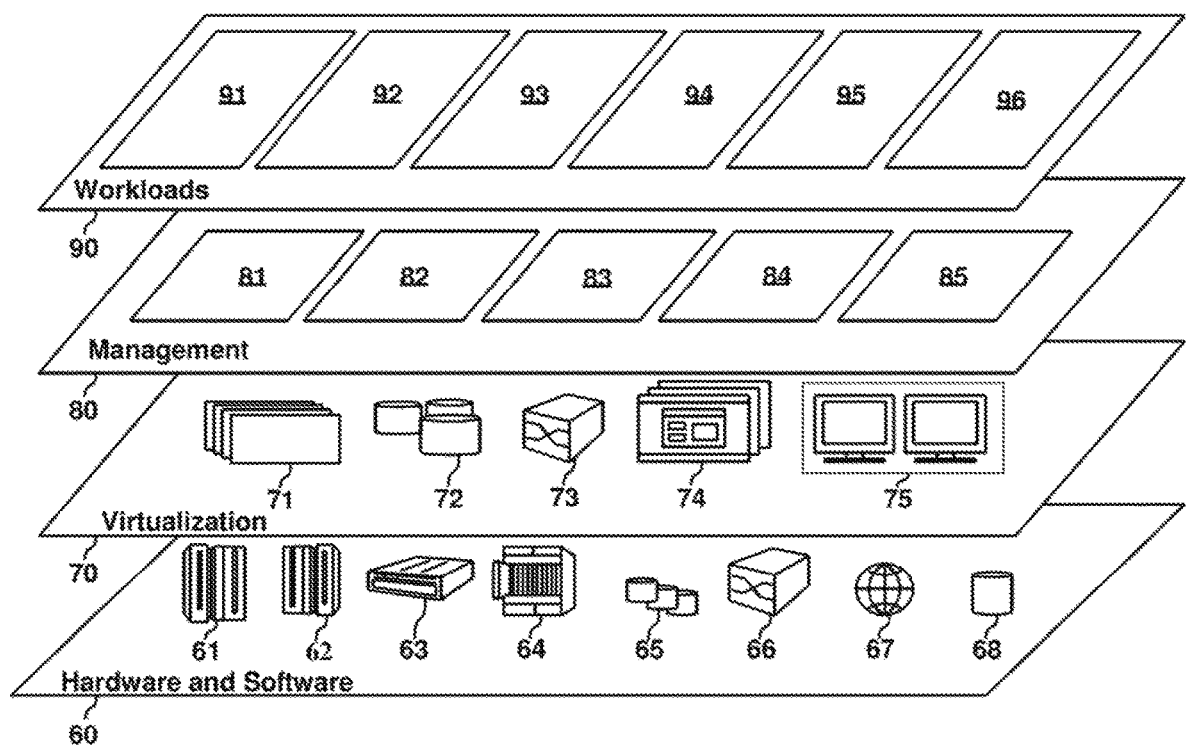
FIG. 8 depicts abstraction model layers according to an embodiment of the present invention.

Referring now to FIG. 8, a set of functional abstraction layers provided by cloud computing environment (FIG. 7, 50) is shown. It should be understood in advance that the components, layers, and functions shown in FIG. 8 are intended to be illustrative only and embodiments of the invention are not limited thereto. As depicted, the following layers and corresponding functions are provided:

Hardware and software layer (60) includes hardware and software components. Examples of hardware components include: mainframes (61); RISC (Reduced Instruction Set Computer) architecture based servers (62); servers (63); blade servers (64); storage devices (65); and networks and networking components (66). In some embodiments, software components include network application server software (67) and database software (68).

Virtualization layer (70) provides an abstraction layer from which the following examples of virtual entities may be provided: virtual servers (71); virtual storage (72); virtual networks (73), including virtual private networks; virtual applications and operating systems (74); and virtual clients (75).

In one example, management layer (80) may provide the functions described below. Resource provisioning (81) provides dynamic procurement of computing resources and other resources that are utilized to perform tasks within the cloud computing environment. Metering and Pricing (82) provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal (83) provides access to the cloud computing environment for consumers and system administrators. Service level management (84) provides cloud computing resource allocation and management such that required service levels are met. Service Level Agreement (SLA) planning and fulfillment (85) provide pre-arrangement for, and procurement of, cloud computing resources for which a future requirement is anticipated in accordance with an SLA.

Workloads layer (90) provides examples of functionality for which the cloud computing environment may be utilized. Examples of workloads and functions which may be provided from this layer include: mapping and navigation (91); software development and lifecycle management (92); virtual classroom education delivery (93); data analytics processing (94); transaction processing (95); and VR environment merging (96).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (102) of the server computing device (101) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for aggregating virtual reality (VR) sessions comprising:
   supporting, by a server computing device, a plurality of requests for a VR session;
   determining, by a similarity engine executing on the server computing device, a similarity between a first VR request and a second VR request based on plurality of shared characteristics;
   detecting, by an object recognition engine executing on the server computing device, plurality of objects in a first VR environment corresponding to the first VR request and a second VR environment corresponding to the second VR request, and determining variations in visual characteristics of the plurality of objects within the first VR environment and the second VR environment to be merged, the visual characteristics of the plurality of objects comprising color, location, and number of objects within the first VR environment and the second VR environment;
      wherein the detecting the plurality of objects comprises limiting the number of objects that are recognized based on available computing resources and user-perceived frame-rate quality, wherein the number of objects is limited to no more than five objects;
   merging, by a merge engine executing on the server computing device, the first VR environment supporting the first VR request and the second VR environment supporting the second VR request to form a merged VR environment, the merged VR environment comprising the first VR environment and the second VR environment,
wherein said merging the first VR environment and the second VR environment comprises modifying the visual characteristics of the plurality of objects in at least one of the first VR environment and the second VR environment over a period of time of at least a minute to eliminate user disorientation while making the first VR environment and the second VR environment identical; and
supporting interactions, by the server computing device, in the merged VR environment between the first VR environment and the second VR environment.

2. The method of claim 1, wherein merging the first VR environment supporting the first VR request and the second VR environment supporting the second VR request comprises merging the first VR environment and the second VR environment in response to a determination that at least one similarity criteria between the first VR environment and the second VR environment exists.

3. The method of claim 2, wherein the similarity criteria comprise a determination of how closely connected a first user submitting the first VR request is with a second user submitting the second VR request within a social network.

4. The method of claim 2, wherein the similarity criteria comprise an extent to which the first VR environment and the second VR environment comprise matching content.

5. The method of claim 2, wherein the similarity criteria comprise an identification of a common object in the first VR environment and the second VR environment.

6. The method of claim 1, comprising incentivizing users to participate in the merged VR environment.

7. A system comprising:
a server computing device to support a plurality of virtual reality (VR) requests; and
a network connection for the server computing device to couple to a plurality of VR systems to form a plurality of VR environments;
the server computing device comprising:
a similarity engine to determine a similarity between a first VR request and a second VR request based on plurality of shared characteristics;
an object recognition engine to detect plurality of objects in a first VR environment corresponding to the first VR request and a second VR environment corresponding to the second VR request, and determine variations in visual characteristics of the plurality of objects within the first VR environment and the second VR environment to be merged, the visual characteristics of the plurality of objects comprising color, location, and number of objects within the first VR environment and the second VR environment;
wherein the detecting the plurality of objects comprises, with an object recognition limiter, limiting the number of objects that are recognized based on available computing resources and user-perceived frame-rate quality, wherein the number of objects is limited to no more than five objects; and
a merge engine to merge the first VR environment supporting the first VR request and the second VR environment supporting the second VR request to form a merged VR environment, the merged VR environment comprising the first VR environment and the second VR environment
wherein said merging the first VR environment and the second VR environment comprises modifying the visual characteristics of the plurality of objects in at least one of the first VR environment and the second VR environment over a period of time of at least a minute to eliminate user disorientation while making the first VR environment and the second VR environment identical; and
the server computing device supporting interactions in the merged VR environment between the first VR environment and the second VR environment.

8. The system of claim 7, wherein a speed at which modifications are made is based on a length of time the first VR environment, the second VR environment, or combinations thereof are to run.

9. The system of claim 7, wherein a speed at which modifications are made is based on previous user expectation handling.

10. A computer program product for aggregating virtual reality (VR) sessions, the computer program product comprising:
a non-transitory computer readable storage medium comprising computer usable program code embodied therewith, the computer usable program code to, when executed by a processor:
determine a similarity between a first VR request and a second VR request based on plurality of shared characteristics;
detect plurality of objects in a first VR environment corresponding to the first VR request and a second VR environment corresponding to the second VR request, and determine variations in visual characteristics of the plurality of objects within the first VR environment and the second VR environment to be merged, the visual characteristics of the plurality of objects comprising color, location, and number of objects within the first VR environment and the second VR environment;
wherein detecting the plurality of objects comprises limiting the number of objects that are recognized based on available computing resources and user-perceived frame-rate quality, wherein the number of objects is limited to no more than five objects;
merge the first VR environment supporting the first VR request and the second VR environment supporting the second VR request to form a merged VR environment, the merged VR environment comprising the first VR environment and the second VR environment,
wherein said merging the first VR environment and the second VR environment comprises modifying the visual characteristics of the plurality of objects in at least one of the first VR environment and the second VR environment over a period of time of at least a minute to eliminate user disorientation while making the first VR environment and the second VR environment identical; and
support interactions in the merged VR environment between the first VR environment and the second VR environment.

11. The computer program product of claim 10, wherein:
merging the first VR environment supporting the first VR request and the second VR environment supporting the second VR request comprises merging the first VR environment and the second VR environment in response to a determination that at least one similarity criteria between the first VR environment and the second VR environment exists, wherein the similarity criteria comprise a determination of how closely connected a first user submitting the first request is with a second user submitting the second request in a social network, an extent to which the first VR environment and the second VR environment comprises matching content, an identification of a common object in the first VR environment and the second VR environment, or combinations thereof.

12. The computer program product of claim 10, wherein the period of time is based on a length of time the first VR environment is to run, a length of time the second VR environment is to run, previous user expectation handling, or combinations thereof.

13. The computer program product of claim 10, comprising computer usable program code to, when executed by the processor, provide incentives to users to participate in the merged VR environment.

\* \* \* \* \*